United States Patent [19]

Duthie

[11] 4,259,358

[45] Mar. 31, 1981

[54] PREPARATION OF FOOD PRODUCTS

[75] Inventor: Iain F. Duthie, Cobham, England

[73] Assignee: Agricultural Production and Vegetable Products, Ltd., Surrey, England

[21] Appl. No.: 547,029

[22] Filed: Feb. 4, 1975

[30] Foreign Application Priority Data

Feb. 14, 1974 [GB] United Kingdom ............... 6843/74
Apr. 19, 1974 [GB] United Kingdom ............. 17373/74

[51] Int. Cl.³ ..................... A23L 1/204; A23L 2/38; A23J 1/00
[52] U.S. Cl. ........................................ 426/46; 426/52; 426/72; 426/598; 426/656
[58] Field of Search .................. 426/46, 656, 2, 64, 426/72, 74, 598, 601, 69, 52, 33; 195/4, 5, 31 R, 11, 7; 455/96, 98, 99, 272, 274

[56] References Cited

U.S. PATENT DOCUMENTS

| | | | |
|---|---|---|---|
| 1,349,000 | 8/1920 | Kellogg et al. | 426/46 X |
| 3,169,876 | 2/1965 | Hoover | 426/52 |
| 3,442,656 | 5/1969 | Meadors | 426/46 X |
| 3,878,305 | 4/1975 | Damico et al. | 426/104 |
| 3,910,820 | 10/1975 | Holt et al. | 195/31 R |
| 3,925,560 | 5/1973 | Scott et al. | 426/807 X |
| 3,941,890 | 3/1976 | Drachenberg | 426/46 |
| 3,962,465 | 6/1976 | Richter et al. | 195/31 R |

FOREIGN PATENT DOCUMENTS

| | | | |
|---|---|---|---|
| 1911107 | 10/1969 | Fed. Rep. of Germany | 260/112 R |
| 1422395 | 11/1965 | France | 260/112 R |
| 2165191 | 7/1973 | France | 426/656 |
| 865837 | 4/1961 | United Kingdom | 426/807 |
| 1137214 | 12/1968 | United Kingdom | 426/807 |
| 1154143 | 6/1969 | United Kingdom | 426/52 |
| 1157515 | 7/1969 | United Kingdom | 195/31 R |
| 1216353 | 12/1970 | United Kingdom | 426/807 |
| 1232640 | 5/1971 | United Kingdom | 426/89 |
| 1240595 | 7/1971 | United Kingdom | 426/52 |
| 1313417 | 4/1973 | United Kingdom | 426/53 |
| 1318848 | 5/1973 | United Kingdom | 426/807 |
| 1348205 | 3/1974 | United Kingdom | 426/52 |
| 1377271 | 12/1974 | United Kingdom | 426/89 |
| 1395967 | 5/1975 | United Kingdom | 426/52 |

OTHER PUBLICATIONS

Sugimoto et al., "Evaluation of Monosaccharides, Disaccharides, and Corn Syrups as Dispersants for Heat-Processed Dry Soy Milk Proteins", *J. of Food Science*, vol. 36, (1971) pp. 346–348.

Dekker et al., "Determination of Starch in Plant Material", *J. Sci. Fd. Agric.*, vol. 22 (1971) pp. 441–444.

Morrill et al, "Feeding Young Calves Processed Starch Combined with an Amylolytic Enzyme", *J. Dairy Sci.*, vol. 53, No. 5, (1970), pp. 566–570.

Morrill et al., "Observations on a High Blood Plasma Ethenyl Syndrome in Calves Due to Fermentation in the Gastrointestinal Tract", *J. Dairy Sci.*, vol. 49, No. 6, (1966), p. 727.

Flink et al., "The Production of a Protein Isolate from Vicia Faba", *Lebensm.–Wiss. U. Technol.*, vol. 6, No. 3, (1973) pp. 102–106.

*Primary Examiner*—Thomas G. Wiseman
*Attorney, Agent, or Firm*—Sherman & Shalloway

[57] ABSTRACT

An aqueous slurry of legume seeds is subjected to amylolytic enzyme treatment, preferably by α-amylase followed by amyloglucosidase. The dry starting material or the slurry may be divided into protein-enhanced and protein-depleted fractions to facilitate treatment. Lipid and/or methionine derivatives may also be added, and the resultant product optionally treated with aldehyde. The products find application as milk-replacers, food ingredients and foods for human and non-human mammals.

29 Claims, No Drawings

PREPARATION OF FOOD PRODUCTS

BACKGROUND OF THE INVENTION

1. Field of the Invention

This invention relates to processes for preparing food products from plant seeds for feeding to young mammals and certain older mammals, to products prepared by the processes and to foods incorporating such food products.

While terms such as "feed" and "feedstuff" are often used to describe foods given to farm livestock and non-human mammals the term "food" can be applied equally to food given to such animals and to man so that when the terms "food product", "product" or "foodstuff" are ued in this Specification, they are to be taken as generally meaning, depending on the context, a food ingredient or food which can be used in the feeding of non-human mammals and of humans.

The products of the process according to the present invention find particular application in the feeding of young farm animals, especially young ruminants such as calves and lambs, and pigs, but the use of such products is not restricted exclusively to the feeding of young farm animals since they also find application in the feeding of other young mammals such as the human infant, domestic pets such as the dog and the cat and certain older animals as described hereinafter.

Young ruminants, such as the young of cattle, sheep and goats, namely the calf, lamb and kid respectively, naturally depend on mother's milk to provide nourishment during the period when, because rumen and other digestive functions are not adequately developed, such animals are unable to utilise the foodstuffs consumed by adult animals of these species. This period encompasses the stage during which the young animals are in the pre-ruminant stage, i.e., when their digestive functions are more akin to those of monogastric animals, and also the subsequent period during which rumen function is developing, but is not yet capable of fully catering for the animal's normal needs. In modern dairy husbandry, it is now common practice to take the calf away from the cow at birth or within several days of birth and to rear the calf independently of its mother's milk by providing a substitute (i.e., milk-replacer) for mother's milk. In the case of calves, intended as replacement animals for the dairy and beef herds, which may have free access to concentrate feed mixtures and roughage such as hay, the period from birth to about three weeks of age is generally regarded as the preruminant stage, while subsequently during the period of developing rumen function, the animal is regarded as being dependent on supply of mother's milk or milk-replacer until about the age of six or seven weeks. The term "young ruminant" will therefore be applied to this type of animal to cover the period from birth until about six or seven weeks of age. In the case of the veal calf, however, concentrate feed mixtures and roughage are not usually provided so that the animal is dependent on the provision of mother's milk or milk-replacer from birth until thirteen to fourteen weeks of age or more, and during this time it is regarded as being in the prerumi nant stage since, because of the dietary regimen, its rumen function does not develop in the usual way. Consequently the term "young ruminant" will also be used for this type of animal to include replacement and veal calves.

Because of the high cost and inconvenience of feeding liquid cow's milk, dried skim milk powder manufactured from cow's milk has become the principal ingredient of milk-replacers for calves and other young ruminants. Dried skim milk possesses important physicochemical properties which have proved necessary for this type of application, such as dispersibility, solubility, suspensibility in aqueous liquid and fat-binding ability, and has favourable characteristics of colour, taste and smell. Thus dried skim milk can provide the major source of protein suitable for the young ruminant, whose requirements in terms of protein-amino acid balance, digestibility and availability appear to be most exacting. At the same time dried skim milk is an important source of energy, providing the milk sugar lactose, which in moderate amounts is well utilised by the young ruminant. Accordingly dried skim milk combined with suitable fats, minerals and vitamins and when reconstituted with water has been demonstrated in practice to meet adequately the rather critical requirements of young ruminants.

However, skim milk powder has been relatively scarce on the world market, its cost has increased sharply in recent years and economic projections suggest that this situation will continue or worsen in the foreseeable future. The situation has been exacerbated by increasing demand for the material as an ingredient for human foods. There have thus been strong incentives to find alternatives to skim milk powder. For example, efforts have been made to develop products from soybean meal, from fishery by-products, such as fish meal, and from microbial sources such as yeasts, to provide substitute protein sources for calf feeding. However, it has not been a simple matter to devise suitable products, at an economical price, which have the desired properties for inclusion in milk-replacers. In particular, problems have occurred with respect to solubility and suspensibility when combined with water; with particle size and digestibility; with digestive upsets and adverse clinical reactions; and with inadequate growth and feed-conversion efficiency.

Certain animal fats and vegetable oils are employed as energy sources in calf foods, but it is not possible to use carbohydrates such as sources and starch as energy sources to any great extent to replace lactose because of the calf's inability to digest such materials and its intolerance to them in the early weeks of its life. This is because, as has been demonstrated in the scientific literature, enzymes which hydrolyse sucrose and starch to simple sugars readily absorbed by the digestive tract are present only in small amounts in the digestive tracts of newly-born calves, lambs and other animals, apart from the enzyme, lactase, which specifically hydrolyses lactose. The amounts of such amylolytic or sucrase enzymes increase only gradually with age and development. In the case of starches and sucrose therefore, the inclusion of more than minimum amounts in milk-replacers also causes digestive upsets and lowered performance of calves. Thus, normally such economical energy sources as sucrose and starch-containing materials can be used only to a very limited extent in milk-replacers for calves.

Equally, the young ruminant is unable to digest and utilise plant fibre which is composed of lignin, cellulose and other related polysaccharides, so that a further limitation is imposed on plant protein sources such as soybeans or derived products.

Apart from the oleaginous seeds sometimes or oil seeds such as soybean and peanut, varieties of legume seeds such as beans, peas, lentils, chickpeas, cowpeas, grams and vetches contain high levels of good quality protein which in itself is well tolerated and utilised by young mammals particularly when supplemented with a small proportion of particular amino acids or complemented with appropriate proteins from other sources. The lipid content of such seeds although acceptable to the young mammal tends to be comparatively low. However, the high fibre level, residing mainly in the seed coat, and the high starch level of the cotyledon have made the use of such seeds undesirable for the feeding of young mammals for the reasons given above. Such seeds are distinctly different in composition from the oleaginous seeds, soybean and peanut, which are rich in oil and contain relatively low levels of starch. Such seeds also differ in composition from cereals such as wheat, oats, barley and milo which, although also rich in starch and fibre are relatively low in protein.

2. Description of Prior Art

Oleaginous seeds which contain high levels of unsaturated fatty acids are also likely to contain active enzymes which can act on such fatty acids during processing to produce most undesirable off-flavours and odours which render resulting products for food use unacceptable to the consumer. For example, it is well known in the case of soybeans that the enzyme, lipoxidase, becomes extremely active whenever soybeans are subjected to processing treatments such as hulling, grinding and slurrying in mild to moderate temperature conditions. The lipoxidase present acts on the unsaturated fatty acids present in soybeans to produce a very large number of lower molecular weight compounds, many of which have an unfavourable flavour impact. Resort has therefore had to be made to heat-treating soybeans before processing or simultaneously treating the soybeans with boiling water and grinding, with further high temperature heat-treatment of the resulting slurry, in an effort to minimise lipoxidase action. Such severe heat-treatments, of course, are likely to affect adversely the solubility and nutritive value of the protein, making the production of milk-replacer type products impossible or difficult. Further, when amylolytic enzymes are used on such substrates care must be taken to ensure that undesirable protease and/or lipoxidase activity is not present in such enzyme preparations which can, through protein hydrolysis, lead to the production of undesirable flavour factors and predispose to undesirable sugar/amino acid interactions and/or through lipoxidase activity lead to off-flavours and tastes as described previously. For this reason, the purity of the enzyme preparations employed must be carefully controlled as must the conditions in which they are allowed to operate. For such reasons too when protease preparations as such are introduced to promote protein breakdown for specific purposes as described in the present Specification, the source, purity and operating conditions of such preparations must be carefully controlled.

It is not apparent from the Specification of U.S. Pat. No. 3,258,407, which describes the extraction of alimentary values from vegetable tissues, that there are suitable provisions for dealing with the serious problems likely to be encountered in employing oleaginous seeds and vegetable tissues as starting materials for the proposed processes, while with the relatively crude enzyme sources employed, their sequence of use and the relatively mild temperature, intermediate pH and fairly long time conditions described in the Specification, there is every chance of producing preparations or products, which, from the points of view of nutritional value, flavour and taste, would be unacceptable.

SUMMARY OF THE INVENTION

It is an object of the present invention to overcome the economic, physico-chemical and physiological problems described hereinbefore by providing a food product containing readily-assimilable nutrients in the form of protein, low molecular weight carbohydrates suitable for feeding to young mammals alone or with added fats and/or other suitable ingredients.

According to the present invention there is provided a process for preparing a food product including treating a slurry of ground or flaked legume material (as hereinafter defined) with aqueous liquid, the slurry having a pH of 8 or less, with amylolytic enzyme at a temperature and for a period sufficient to liquefy and hydrolyse at least part of the starch contained in said legume material to dextrins.

The "legume material" which is the raw material for the process of this invention is derived from edible seeds of leguminous plants which belong to the family Leguminosae. The word "pulse" (plural "pulses") is generally used for this class of edible seeds in most English-speaking countries. The term "grain-legumes" is often used in modern textbooks and reports, "grain" serving to emphasise that there are intended the seeds, rather than the pods and leaves of leguminous plants; and the species eaten by man and animals, rather than the vast range of leguminous plants in general. However, throughout the body of this Specification and in the Claims the term "legume" (plural "legumes") will be employed to mean the edible seeds of leguminous plants eaten by man and animals since this term is well enough understood in countries in which "pulse" is more popular, and since in certain countries these latter words are not used, or even understood.

Further the term "legume material" used herein is to be regarded as applying only to material derived from legumes rich in protein and starch, as opposed to legumes rich in oil, that is oleaginous legumes. By "legumes rich in protein and starch" is meant whole legumes having a protein content of from 15 to 48% or more and a starch content of from 35 to 75% on a dry matter basis, but most commonly having a protein content of from 20 to 36% and a starch content of from 55 to 70%. Such legumes are distinguished from oleaginous seeds by having a lipid content only of from 0.5 to 5.0%, and more commonly of from 1.0 to 2.5%. Legume material derived from legumes of the genus Lupinus may also be used in the process according to this invention since such legumes are rich in protein, having a protein content of from 40 to 50%, although they may contain somewhat lower amounts of starch and higher amounts of oil than other legumes.

In this Specification, as is usual in the art, protein is assessed as crude protein on the basis of percentage nitrogen content multiplied by the factor 6.25, while starch is assessed as the nitrogen-free extractives less such substances as sugars, α-galactosides and soluble haemicelluloses and comprises starch, amylose, amylopectin, amylodextrin and a variety of glucosyl oligosaccharides having α-D-1-4, and α-D-1-6 glycosidic linkages.

Accordingly, for the purpose of this invention, a distinction is thus made between legumes rich in protein and starch and the oleaginous legumes, rich in protein and lipids, for example soybean (*Glycine max*) which contains approximately 40 and 21% protein and lipid respectively on a dry matter basis, but relatively little starch; and peanut (*Arachis hypogaea*) which also contains large amounts of protein and lipid, approximately 27 and 46% respectively. A distinction is also made between legumes rich in protein and starch, and cereal grains such as wheat, maize, oats, barley and milo which, while being rich in starch, usually contain relatively small proportions of protein, for example from 10 to 13.5% protein on a dry matter basis.

The process according to the present invention is thus clearly distinguished from that described in Canadian Patent Specification No. 803,488 which relates to the preparing from farinaceous matter such as barley by treatment with amylolytic and proteolytic enzymes an extract which may, for example, be refined to yield brewers' wort.

DETAILED DESCRIPTION OF THE INVENTION

The beans of *Vicia faba* L. of the family Leguminosae, comprising the two sub-species *Vicia faba* L. var. minor, which is now being grown on an increasing scale both in Europe and in other parts of the world, and *Vicia faba* L. var. major, provide the most preferred legume material for the process of this invention. The plant and its seeds may carry more than one name in the everyday vocabulary of most European and other languages, probably because of the age-old cultivation of this plant in regions far apart. Irrespective of the common names employed in various countries throughout the world, all such beans of the genus Vicia and species *Vicia faba* L. provide the most preferred legume for the process of the present invention.

Seeds of some other genera also provide particularly useful legume materials for the process of the present invention, for example seeds of the genera Phaseolus, Pisum, Lens, Cicer, Cajanus, Canavalia, Vigna, Dolichos and Lupinus.

Thus, for example, legumes from varieties and related species of the following may be used to provide legume material: *Phaseolus lunatus* L., *Phaseolus coccineus* L. (syn. *Phaseolus multiflorus* L.), *Phaseolus mungo* L., *Phaseolus vulgaris* L. and *Phaseolus aureus* L.; *Pisum sativum* L. and *Pisum arvense* L.; *Lens culinaris* L. and *Lens esculenta* L; *Cicer arietinum* L.; *Cajanus cajan* L. and *Cajanus indicus* L.; *Canavalia ensiformis* L.; *Vigna unguiculata* L. and *Vigna sinesis* L.; *Dolichos lablab* L.; *Lupinus albus* L., *Lupinus luteus* L., *Lupinus augustifolius* L.; *Vicia faba* L. and *Vicia sativa* L.

The citation of these particular genera and varieties of the Leguminosae does not exclude other protein- and starch-rich seeds of other genera suitable for the purpose.

Preferably varieties of seeds are used containing relatively soluble protein, containing starch with a relatively low gelatinisation temperature, and relatively free from toxic principles known to be associated with certain types of legumes. Clean, whole mature beans are most suitable.

Legumes consist of an outer seed coat or testa and the embryo, with cotyledons being the predominant structure of the latter; for this reason the term "cotyledons" is used hereinafter to describe legumes with the seed coat removed. The seed coat may be removed by one of the usual methods of dry or wet processing to provide cotyledons substantially free of seed coat or testa, that is hulled legumes. Either whole legumes or hulled legumes may be employed to provide the legume starting material.

For processing, the whole legumes or hulled legumes may be finely ground employing a dry or wet grinding process such as is known in the art. If desired, a flour prepared by dry grinding may be subjected to an air classification procedure, such as employed for wheat flour, also to provide protein-enhanced or protein-depleted (starch-enhanced) legume material.

Alternatively the whole or hulled legumes, cracked if desired, may be subjected to treatment with flaking rollers, with or without prior conditioning treatment with heat and moisture such as hot water or steam treatment, to produce thin flakes of a thickness of about from 0.07 to 0.20 mm.

The process according to the present invention keeps to a minimum the conditions of heat treatment of the legume material in the interests of preserving the functional properties and nutritive value of the protein component, maintaining the manageability of the slurry and effecting processing economics. However, because certain otherwise desirable seeds contain heat-labile toxins or contain starches having relatively high gelatinisation temperatures, and because heat-treatment sufficient to inactivate such toxic principles or gelatinise such starches will not have an undue adverse effect on products intended for certain applications, the various forms of material such as whole or hulled legumes prior to grinding or ground whole, hulled or classified legume material may be heat-treated by a method well known in the art such as dry heat, exposure to infra-red radiation, boiling, autoclaving at a temperature of from 100° to 130° C. for up to 60 minutes, treatment in thermoplastic extrusion equipment, steaming or flaking. Equally, certain seeds will not require such an extreme heat treatment and they are, of course, preferred for providing legume material for reasons which will be made clear in the following description.

As mentioned hereinbefore, the ability of young mammals, particularly young ruminants, to digest starch is limited, and it is an important feature of the present invention to effect reduction of starch present in legume material into forms which can be digested by young mammals. This is accomplished by treating a slurry of legume material in aqueous liquid with one or more amylolytic enzymes capable of hydrolysing starch contained therein to forms of carbohydrate readily digested by young mammals, in the case of young ruminants such forms being mainly dextrose and small amounts of di- and tri-saccharides composed of glucose units. This treatment prefaced by a protein-solubilisation step, if so desired, is accomplished as follows.

A slurry of ground or flaked legume material, which may, if considered desirable have been heat-treated as described above, is made with aqueous liquid, preferably in a weight ratio of 1:1 to 1:15 on a dry matter basis. The pH of such a slurry may then be adjusted with a suitable alkali to a value of from the natural value to 10.0 and stirred for from 5 to 60 minutes at a temperature preferably of from 10° to 65° C. to permit solubilisation of the protein component. Alternatively the stirring treatment to solubilise protein may be performed with the pH at the natural value which term is explained as follows: when whole or hulled legume material is slurried with aqueous liquid of about neutral pH, the pH value of the resultant mixture is the natural value; in most cases this will be between about 5.8 and 6.5, although, depending on the nature of the raw material and source of aqueous liquid, values somewhat outside this range may sometimes be obtained.

It is possible to utilise a liquid emanating from another process or source which contains useful nutritive components such as proteins and amino acids, sugars, fats, minerals and unidentified growth factors, when the recovery of such components from the liquid by evaporation, drying or other means is impracticable for technical or economic reasons. Examples of such liquids are whole, skimmed or separated milk, whey from cheese-making processes, waste waters from meat- and fish-processing, liquors from expression of plant materials such as alfalfa, grass and other vegetable sources and from fermentation processes. Such a dilute or partially concentrated solution or suspension may be used as the aqueous medium for slurrying the legume material, thereby allowing the efficient disposal of such liquids, allowing utilisation of their nutritive and heat content, providing some complementation and supplementation of the composition of the nutritive value of the legume material, and, when the products are dried, permitting economies in terms of independent evaporation and drying of the dilute solutions or suspensions from other processes or sources.

Hydrolysis of starch as such may be accomplished by initial gelatinisation of the starch by acid treatment and boiling another, or such treatment followed by treatment with amylolytic enzymes as is described in the literature.

It is also known that liquefaction of starches for subsequent enzymatic hydrolysis may be achieved at temperatures lower than boiling in the presence of the amylolytic enzyme, α-amylase, and that saccharification of such liquefied starches may be substantially achieved by further treatment with a second amylolytic enzyme, amyloglucosidase. Typical of such prior art processes for producing dextrose from purified or semi-purified starch are those described in U.S. Pat. Nos. 2,967,814, 3,039,935 and 3,265,586; and in the previously-mentioned Canadian Specification No. 803,488. In the process according to the present invention a slurry of comminuted legume material is preferably treated by adding to the slurry either α-amylase alone or α-amylase followed by amyloglucosidase. Many of the legume starches have relatively low gelatinisation temperatures, and the process of the present invention employs this property in conjunction with liquefaction in the presence of α-amylase to ensure that liquefaction is carried out at a temperature low enough and for a time period short enough to protect the properties of the protein, but at the same time adequate to allow liquefaction of the starch component in the presence of α-amylase, thereby achieving a more manageable slurry.

To effect starch hydrolysis in a preferred process according to the present invention the slurry is adjusted, if necessary, to a pH in the acid or near acid range, preferably from 5.0 to 8.0, and most preferably about 6.0 to 7.0, with, for example, sodium hydroxide, and a preparation of α-amylase such as is commercially available in a suitably purified form and preferably from a bacterial source and tolerant to relatively high temperatures, is added with stirring as necessary at a rate preferably of 0.25 to 5.0 gram or more per kilogram of dry legume material of a preparation containing 1000 to 1500 SKB units of α-amylase activity per gram and most preferably at a rate of from 0.5 to 2.5 gram of such a preparation. While stirring is continued, the temperature of the enzyme-containing slurry may be raised gradually to a temperature of from 40° to 100° C., preferably of from 40° to 85° C., and maintained at the selected temperature preferably for 2 to 120 minutes. It is, however, more preferred to raise the temperature of the slurry from the initial slurry temperature to 65° to 70° C. at a rate of from 1½ to 2½C°/min., then to a temperature of from 70° to 85° C. at a rate of ¼ to 1½C°/min. and to maintain the attained slurry temperature for 15 to 45 minutes. This stage of the process accomplishes liquefaction of the starch component of the legume material and initiates starch hydrolysis by producing dextrins. The resulting slurry may, either with the enzyme in an active state or with the enzyme inactivated by heat treatment or other means, be used, depending on the application, for food in the wet state with or without lipid material incorporated by homogenisation as described hereinafter, or the slurry with or without lipid may be spray or drum dried. If, however, the intermediate product slurry is cooled to a temperature of from 40° to 70° C., preferably of from 55° to 65° C. with continued stirring at the reduced temperature for a prolonged period of up to four days further activity of the α-amylase will cause a considerable degree of dextrinisation and saccharification.

In certain legumes, even though their lipid content is low, there is a possibility that the presence of active lipoxidases may give rise to off-flavours, and if such legume material is not previously heat-treated to destroy such enzymes, the initial slurry of legume material in water should be made with water at such a temperature that the initial temperature of the slurry is sufficiently high to inhibit the action of such enzymes, for example, from 45° to 70° C., α-amylase may then be incorporated, and the temperature of the slurry elevated in the minimum time so that such enzymes are destroyed.

α-Amylase is dependent to some extent for its activity and stability at elevated temperatures on the presence of calcium and magnesium ions, whereas protein solubility may be dependent on the ionic concentration of the aqueous medium, sometimes being diminished by such ions when present above a certain concentration. Therefore, depending on the source and characteristics of the water supply available, attention should be given to adjustment of the composition of the water by purification or addition of a sequestering agent such as CALGON (a glassy form of sodium hexametaphosphate containing a small amount of sodium pyrophosphate), or addition of calcium ions to the slurry.

As a superior alternative to prolonged α-amylase treatment it is preferred to add another amylolytic enzyme, amyloglucosidase, to promote saccharification. Consequently it is preferred in the process of this invention to adjust the pH of the α-amylase-treated slurry to a value of from 3.0 to 7.0, preferably of from 3.5 to 6.0, and the temperature to a temperature of from 40° to 70° C., preferably of from 40° to 65° C., and to add a preparation of amyloglucosidase such as commercially available in suitably pure form and preferably of fungal origin and to continue stirring until the desired degree of saccharification has taken place. The amyloglucosidase preparation is added at a rate of, for example, from 0.25 to 6.25 gram per kilogram dry legume material of a preparation providing about 100 to 175 AG units per gram, preferably 0.5 to 3.0 gram of such a preparation. Complete saccharification takes place in three to four days but, in the present process, however, it is not usually necessary to attain a degree of starch hydrolysis approaching total hydrolysis to monosaccharide units for economic and nutritional reasons, while prolonged exposure of the protein component in slurry conditions may produce undesirable effects. A much shorter period of saccharification is therefore preferably conducted, of from 5 minutes to 36 hours, preferably less than 10 hours. A particularly preferred set of hydrolysis conditions is a pH of from 4.5 to 5.0, a temperature of from 50° to 60° C. and a hydrolysis period of from 3 to 6 hours. Starch reduction is thereby effected to provide the desired degree of hydrolysis to dextrose units and short chain molecules which can be digested by the young mammal.

Further, treatment with amyloglucosidase is conducted only for the time period necessary to achieve the required degree of saccharification of starch to meet the nutritional requirements of the intended consumer, and this period is of considerably shorter duration than that required by known processes employed for the purpose of dextrose manufacture from starch or otherwise intended to achieve maximum conversion of starch to dextrose.

In certain circumstances the following methods of treatment by amylolytic enzymes may be employed. Legume material at least partly pregelatinised or similarly altered by dry or moist methods of treatment may be slurried with aqueous liquid as before and at a pH of from 3.5 to 7.0 and a temperature of from 40° to 85° C. and treated with an α-amylase only, an α-amylase plus an amyloglucosidase preparation, an α-amylase followed by an amyloglucosidase or amyloglucosidase preparation alone, for from 5 minutes to 36 hours, such enzymes being as hereinbefore described as far as origin, purity and rates of addition are concerned.

Processing treatment with enzymes may be employed to remove substances present in some strains of legume seeds which may be undesirable under certain circumstances. For example the substance vicine (2,4-diamino-6-oxypyrimidine-5-($\beta$-D-glucopyranoside) may be present in strains of *Vicia faba* L. and it may be desirable to reduce or eliminate this compound when such strains are utilised for making products for human food use.

The solubility characteristics of this compound will allow its removal to a considerable extent by extraction of ground legume material with water at the iso-electric pH of the protein prior to processing but such a procedure may not be convenient in many situations. Processing at pH conditions in the acid or near acid range especially at an elevated temperature will tend to promote breakdown of the compound, since it is relatively unstable in such conditions.

It is known in the scientific literature that the enzyme $\beta$-glucosidase hydrolyses vicine to divicine and glucose. Therefore $\beta$-glucosidase activity such as is present in cellulase preparations, for example those prepared from fungi, may be utilised to promote hydrolysis in pH conditions preferably in the acid range. The resulting compound, divicine is inherently unstable in aqueous solution in the presence of oxygen, especially in pH conditions in the alkaline or near alkaline range so that the adjustment of pH from the acid to the alkaline range following treatment with $\beta$-glucosidase-containing preparations will promote destruction of divicine. Such treatment may be carried out solely for the purpose of reducing vicine content or in conjunction with the other procedures described herein for the same purpose.

For example, $\beta$-glucosidase may be added to the slurry towards the end of the amyloglucosidase treatment period and allowed to act for an appropriate time, with adjustment of the temperature to a temperature of from 20° to 65° C. and adjustment of the pH to a value of from 4.5 to 7.0.

Following enzyme treatment the temperature of the slurry may be elevated finally for a short time to destroy the enzymes if desired, and for some applications this may be desirable. However, as it may be usually an advantage to retain the enzymes in an active form to contribute to the characteristics of the final products, it may be desirable not so to elevate the temperature of the slurry at the end of the saccharification stage.

While the saccharification product may be spray dried at the pH of amyloglucosidase treatment, as a next stage of the process, it is desirable to elevate the pH of the slurry preferably to a value of from 6.0 to 9.0, preferably 6.0 to 8.0, for a period of from 5 to 45 minutes at a temperature of from 40° to 85° C., particularly if insoluble components are to be removed or if liquids, that is fat or oils, are to be incorporated into the slurry in a manner to be hereinafter described, in order to maximise the yield of solubilised protein and to allow development of the protein's optimum physico-chemical properties.

In certain situations it may be desirable to employ a protease or proteolytic enzyme for a short period in the later stages of α-amylase treatment or after to control viscosity, when, for example, the protein content of the slurry treated by amylolytic enzyme is high, or to create a suitable degree of protein hydrolysis to peptides and amino acids for particular product applications. Obviously an enzyme will be chosen, the pH and temperature optima and purity of which are compatible with the conditions of the stage of the process at which the protease is introduced.

When the hull-free cotyledons are employed as the legume material a small proportion of fibre and indigestible polysaccharide material normally present in cotyledons will be present in the slurry following enzyme treatment together with an amount of starch which will depend on the degree of thoroughness of the enzyme digestion process. Depending on the characteristics desired in the final product, the amylolytic enzyme-treated slurry may be subjected to coarse filtration to remove such residual gross indigestible or undigested material, leaving any fine grained undigested starch in the filtrate, or the slurry may be subjected to more rigorous filtration or centrifugation, thereby providing a filtrate or centrifugate containing mainly dissolved protein and starch digestion products, and little or no insoluble matter.

When comminuted whole legumes are employed as the legume material, the insoluble and indigestible hull particles may be removed similarly by coarse filtration, together with any residual gross undigested cotyledon material as mentioned above. It will be apparent that this stage provides a simple alternative means, unique to the present invention, of removing hull material in this type of process, as opposed to more conventional and complicated techniques of removing the hulls from whole seeds by costly dry or wet methods. This type of filtration will also provide a filtrate containing undigested starch grains, and equally a filtrate or centrifugate containing mainly dissolved protein and starch digestion products may be obtained by fine filtration or centrifugation.

Three types of wet products can thus be obtained as follows:

A filtrate or centrifugate containing essentially protein and starch digestion products;

A filtrate or centrifugate containing protein and starch digestion products together with an amount of starch depending on the degree of enzyme hydrolysis and separation employed;

A slurry containing protein, starch digestion products, starch and indigestible material the quantity of which will depend largely on whether or not hulled or whole legumes were employed as the starting material.

All three types of wet product may be regarded as final products in their own right, or as final products after incorporation of fat or oil and minerals and vitamins to provide liquid milk-like products of a more complete nutritional composition, which can be fed to young mammals in liquid form. Products such as these provide examples of applications for which enzyme deactivation may be desirable as mentioned hereinbefore.

Undigested material which is allowed to remain in the slurry or is not removed by filtration or centrifugation will be composed of starch and cell wall and structural material such as cellulose and haemicelluloses together with pectin and similar substances. Only small percentages of such cell wall material will be present in wet or dried products and it can be regarded as being indigestible by the young mammal. To the extent that such material possesses the ability to absorb and retain water it can be regarded in certain circumstances as a desirable product constituent, since, in a finely-divided state, it will assist in maintaining alimentary tract function and faeces consistency, thus aiding in the avoidance of constipation or diarrhoeal effects. However, if it is desired to optimise production of digestible carbohydrate from such material or to assist particle size reduction as hereinafter described, suitable enzymes may be introduced at appropriate stages. For example, cellulases, haemicallulases and pectinases suitable for such a purpose are available commercially, and a useful degree of effect can be obtained from introduction of suitable types of these enzymes. For example if introduced at the saccharification stage, enzymes with pH optima in the acid range and temperature optima at moderately high temperatures are obviously preferred. A further advantage of employing such enzyme preparations, particularly cellulases, is that they are capable of reducing the amounts of certain carbohydrate substances, such as raffinose and stachyose, commonly present in legumes which may be important in certain circumstances as discussed hereinafter.

Consumption of legume seeds is well known to be associated with gas production in the lower bowel, or flatus. Much research effort in recent years has been devoted to attempting to determine the factor or factors responsible and the mechanisms involved. While it has not proved a simple matter to elucidate the causes of flatus, considerable evidence in the scientific literature points to the involvement of low molecular weight compounds present in legume seeds. These compounds are members of the raffinose family composed of a sucrose molecule and one or more galactose molecules joined by $\alpha$-glycosidic bonds, such as raffinose, stachyose, ajugose and verbascose.

The digestive tract of the human and certain other mammals does not possess enzyme systems capable of hydrolysing such compounds and according to the theory they pass to the lower bowel where resident microorganisms may be able to metabolise them with consequent gas production. It is known in the art that such compounds in legume seeds are markedly reduced or removed if the seeds are hydrated for up to 24 hours or more and allowed to germinate for a further period of up to two or three days, so that such treatment may be employed to achieve this effect when desired. Also it is known in the art that the enzyme $\alpha$-galactosidase produces a similar effect by hydrolysing such compounds by removal of galactose molecules, while the enzyme invertase also acts on such molecules by removing the fructose molecule. Hence apart from the beneficial action of any such enzymes residing in the legume material, addition of preparations having $\alpha$-galactosidase and/or invertase activity at appropriate stages and under appropriate conditions will assist in reducing the content of members of the raffinose family and sucrose.

Depending on the proportion of legume material and water used for the initial slurry, it may be desirable to pasteurise, or to concentrate the preparations, by methods which are well known, to concentrations more suitable for direct use or for further processing but care must be taken not to affect the properties of the protein by exposure to high temperatures for prolonged periods.

All three types of wet product may be dried using well known procedures such as spray or drum drying, preferably with prior homogenisation in the case of intermediate products containing particulate matter. Such dried products may be used for formulating foods for young mammals, in combination with other ingredients which are well known in the art. Normally, however, wet products containing hull material or much undigested coarse cotyledon material would not provide such suitable end products as those from which starch has been removed or which contain moderate amounts of fine starch.

It is very desirable to obtain final products which contain substantial amounts of fat in the form of dry, free-flowing powders which on mixing with water will disperse readily and remain in suspension for suitable periods of time. As is known in the art, such products may be made by incorporating lipid material into skimmed or separated milk by homogenisation with suitable emulsifiers and stabilisers prior to spray or drum drying. Also it is known that solutions of the isolated milk protein, casein, may be used in a similar way to prepare powdered emulsions, when homogenised with lipids, sugars, emulsifiers, stabilisers, flavouring and colouring agents.

In such processes, the protein in solution is believed to envelop the lipid droplets with a fine film of protein so that they may be dispersed, allowing the emulsifying agent to create a stable oil-in-water emulsion. For this purpose casein has unusual properties of solubility and functional activity for which in the past it has not been easy to obtain economical substitutes. It has been shown, however, that isolated vegetable protein from the oil seed, soybean, can have somewhat similar properties.

Because of the manner in which the process according to the present invention has been conducted, the wet products contain a substantial proportion of functionally active legume proteins which can act in a similar way to casein and isolated soybean protein, since their solubility and functional properties have been substantially unimpaired by the processing treatments.

It is thus a novel feature of the present invention that it allows legume material protein to be used for this purpose and provides a novel manner of preparing stable emulsions for direct use or for the production of powdered emulsions with physico-chemical and nutritional properties resembling those of dried skim milk preparations.

To prepare such an emulsion, the wet product maintained at a similar temperature range to that employed earlier, for example from 40° to 85° C., preferably from 50° to 80° C., is homogenised with a lipid containing emulsifying agent, at a similar temperature, and optionally if considered desirable, a stabilising agent, and subjected to spray or drum drying. During or after drying a flow agent may be added to the powder.

In an alternative embodiment, lipid material may be incorporated with the slurry before amylolytic enzyme treatment.

Lipid materials that may be used for the preparation of foodstuffs for mammals fat or oil employed in the art, either as such or after partial hydrogenation, such as tallow, lard, poultry fat or partially hydrogenated marine oil, or a vegetable fat or oil as such or after partial hydrogenation, such as coconut, palm, soybean, corn- (maize), arachis (peanut), sunflower seed, safflower seed, rape seed, palm kernel, cottonseed, or linseed oil, individually or in combination. Depending, however, on the use of the end product, other suitable fats and oils used in the art may be incorporated. Use of such unsaturated vegetable oils may be of value in animal and human dietetic applications, and with certain sources if may be necessary to include an antioxidant.

An emulsifying agent as employed in the art is preferably used, such as lecithin, a sucroglyceride, a blend of a sorbitan fatty acid ester and a polyoxyethylene sorbitan fatty ester or other synthetic emulsifying agents. Among other useful emulsifying agents are glycerol monopalmitate, glycerol monostearate, glycerol monooleate, glycerol monomyristate, glycerol monolaurate, decaglycerol monopalmitate, decaglycerol monomyristate, decaglycerol monooleate, decaglycerol monostearate, triglycerol monostearate, triglycerol monopalmitate, hexaglycerol monostearate, hexaglycerol monostearate, hexaglycerol dipalmitate; a mixed partial ester, e.g., a mixed glycerol monopalmitate (90%) and glycerol dipalmitate (10%); and glycerol-lacto-monopalmitate.

The flow and dessicant agent is preferably based on silicon dioxide or aluminium silicate but other flow agents used in the art may be incorporated.

The amount of lipid material incorporated will depend on what composition of the dried product that is considered desirable. For example, if a product to replace dried skim milk is required, only sufficient fat or oil to enhance dispersibility and suspension properties should be used, if desired.

If, on the other hand, a product is required which will act as a vehicle for lipid and present it in a milk-replacer formulation with suitable physico-chemical properties and in a readily digestible form, then a large amount of lipid material should be incorporated to yield a product containing from 4 to 90%, preferably from 10 to 80% lipid and 10 to 50% protein.

When a substantial amount of lipid material is incorporated in a wet product, the composition of the resultant final product will depend to some extent on the nature of the wet product, that is on whether it contains, for example, a very small proportion of insoluble carbohydrate or carbohydrate digestion product or, at the other mixture, in digested and undigested form, more or less all the carbohydrate originally present in the starting, preferably hulled legume material. In the latter case, for instance, lipid may be incorporated in an amount of from about 0.125 to 12 times that of the protein present, so that, for example, the dried product will contain from about 4 to 80% lipid and about 6 to 30% protein. The carbohydrate content of such a product will be from about 10% to 50%, with the proportion of digestible to indigestible carbohydrate depending on the degree of enzymatic hydrolysis employed, but being in the range of about from 10 to 90% Dextrose Equivalent. It will be realised, of course, that the protein and carbohydrate content of the hulled legume starting material will govern the composition of the final product to some extent.

On the other hand, when only a small proportion of carbohydrate or carbohydrate digestion product is allowed to remain in the slurry for treatment by amylolytic enzymes, the composition of the dried powdered product will be mainly protein or protein and lipid in the approximate range of from 4 to 90% of lipid or protein.

When carbohydrate is partially removed in the process and lipid subsequently incorporated, the dried powdered product will have a composition intermediate between that of a product prepared from hulled legume material without insoluble carbohydrate removal, and that of a product prepared from hulled legume material with more or less complete insoluble carbohydrate removal. Obviously a wet product will have a corresponding composition, as will a wet or dried product in which lipid has not been incorporated.

It will thus be readily appreciated that the present invention allows the manufacture of a large number of wet or dried products and the facility of predetermining the compositions and characteristics of products for specified purposes.

Fine reduction of particle size aids solubilisation of the constituents of the legume material such as protein and also assists the action of the amylolytic and other enzymes employed in the process, maximising both the quantity of starch and also the surface area of the starch particles available for enzymatic degradation. While suitable particle sizes of about a millimeter in diameter can readily be obtained using conventional grinding equipment, smaller particle sizes can usually be so obtained only with marked reduction in output and increased expenditure of energy; furthermore the temperature of the legume material may be raised by grinding which may have adverse effects on subsequent processing and on its properties. Equally, excessively fine wet grinding initially may not be advantageous or economical.

However, as a result of the slurrying step, the particles or flakes of legume material hydrate and soften, so that further particle size reduction may readily be achieved at any stage after slurrying, by subjecting the slurry to treatment in continuous automatic equipment, designed to disintegrate and disperse the particles to provide a fine smooth suspension, such as may be obtained, for example, by use of a high-shear mixer or by passage through a pipe-line mixer, by shearing between a stator and high speed rotor and/or by passage through a high shear screen, or by employing a conventional one- or two-stage preferably pressure, homogenising machine. Accordingly such particle size reduction or disintegration may be carried out at one or more of subsequent stages of the process, namely, prior to or during the digestion stage employing the α-amylase, and/or prior to or during the digestion stage employing amyloglucosidase.

When insoluble carbohydrate is not removed or only partially removed during processing, such homogenisation is also beneficial in that it assists in ensuring that the particle size of the wet and dried products is small and that the texture is smooth, and aids dispersion and suspension of the dried products in water. To this end also homogenisation may be conducted on termination of the amyloglucosidase digestion stage and prior to drying or lipid incorporation and drying.

When other materials or liquids containing useful nutritive components are incorporated at the initial slurry stage or subsequently during the process, it may be advantageous to subject the mixture to homogenisation to ensure thorough mixing and adequate particle size reduction.

It is usual practice to incorporate a small amount of isolated starch in foods for young mammals to take advantage of the degree to which the particular animal can utilise starch. As mentioned in the foregoing, the calf's ability to utilise unprocessed starch is very limited. If such an isolated starch is specially prepared to improve its assimilability by, for example, the young calf, it will be correspondingly more expensive. As previously described certain of the preparations according to the present invention contain an amount of starch. However, the legume starches will have been subjected to heat treatment and to liquefaction and will therefore be presented in the final product in a form more suitable for the digestive systems of young mammals than raw starches. At the same time the process according to the present invention allows the retention of anzymatic activity, particularly of the amyloglucosidase, which when present in the warm reconstituted milk-replacer and in the alimentary tract of the recipient young animal will effectively continue the saccharification process in conjunction with the enzymes normally present in the digestive tract to allow adequate utilisation of the starch present, and other pregelatinised starches used in formulating the feed.

As a protein source, legume protein tends to be rich in the essential amino acid, lysine, but to contain a moderate or small amount of the sulphur-containing amino acids, methionine and cystine. It can, therefore, be an advantage in many circumstances to elevate the proportion of methionine in the final products by adding synthetic methionine as a nutrient in either its laevo or dextro-laevo isomeric form, or any suitable analogues or derivative of methionine in either of these forms in order to balance or improve the amino acid profile of the legume material protein and thereby to increase and optimise its protein value.

Methionine-containing compounds or analogues such as N-stearoyl-DL-methionine, N-oleoyl-DL-methionine, N-decanoyl-DL-methionine, N-octanoyl-DL-methionine, a salt or ester thereof, a fatty acid glycerol ester of methionine, or a mixture of two or more thereof are suitable for incorporation in products for animal and human food use. Methionine and such analogues on their own, or admixed with small quantities of melted lipid as an adjuvant, may be added to the slurry when the substantial quantities of lipid required to make an emulsion as such are not subsequently added, or before or after such lipid incorporation. Such treatments provide valuable protection for methionine and such analogues both in wet and dried products, because of enrobement of particles or droplets of methionine analogue or methionine analogue/adjuvant lipid in and protection by a film of legume protein. This, furthermore, helps to contain any undesirable flavours and odours possessed by such compounds, a desirable effect as far as the consumer is concerned. It may be similarly advantageous to incorporate methionine and such analogues in the lipid which is to be added to the slurry, to assist in their incorporation and dispersion in the slurry. By such means, difficulties which have been encountered, in incorporation of methionine in foodstuffs for animals and humans, may be overcome.

While a sufficient quantity of methionine may be incorporated in such a way into the slurry to supplement the legume protein contained therein, it will be apparent that if excess methionine is incorporated, the product so obtained can be used as a supplement to other foodstuffs and mixtures which are deficient in methionine, to provide methionine in a protected form.

Equally, synthetic forms of laevo cystine or cysteine may be used. In certain circumstances it may be useful or advisable to incorporate lysine and other essential amino acids or their derivatives and in the case of these amino acids the laevo forms are preferred. Such amino acids may be incorporated by adding them to the slurry or lipid-containing homogenised preparation prior to drying or to the dried powder. It will also be understood that other sources of sulphur-containing amino acids, for example proteins such as casein and gluten, and animal and vegetable materials rich in proteins containing the desired amino acids may also be incorporated to augment and supplement the amino acid composition of the legume protein and, depending on the characteristics of such materials, it may be a distinct advantage to incorporate them prior to homogenisation or at an earlier stage, rather than after drying, to take advantage of the liquefaction and enzyme hydrolysis stages to improve their properties for incorporation, and to render them more suitable for inclusion in foods for young mammals by reduction in particle size and improvement in suspension and digestibility characteristics.

The protein and starch components of the slurry of legume material may be separated from each other by filtration or centrifugation to varying extents prior to amylolytic enzyme treatment to allow appropriate separate processing of the fractions so obtained, with recombination if desired.

Obviously, depending on whether filtration or centrifugation is employed and depending on the efficiency of the equipment in either case, the protein-containing liquor will also contain a certain amount of starch and polysaccharide material, the amount present ranging from a high proportion of the original carbohydrate to extremely small amounts, depending on whether conditions ranging from coarse filtration to high speed centrifugation are employed. When substantial amounts of starch are present in the protein-containing liquor, this material may be treated by the enzyme processes herein described to liquefy and/or hydrolyse the starch contained therein and processed independently without recombination, to provide products with enhanced protein:carbohydrate ratios. When small or moderate amounts of starch are present in the protein-enhanced fraction, such materials may also be treated by the enzyme processes herein described to hydrolyse the starch contained therein, but if the starch content is tolerable in terms of the eventual application intended, such protein-containing solutions may be recombined with the separately-treated starch fraction without processing to hydrolyse such starch.

The protein-depleted resultant fraction that is relatively higher in content of starch, polysaccharides and, in the case of whole legume starting material, seed coat, than the original legume material slurry may be subjected, wholly or partly, to processes such as those described earlier for starch liquefaction, or liquefaction and saccharification, except that more severe conditions may be employed without fear of damaging the general protein content of the starting material; in the case of whole legume starting material, hull and undigested material may be removed after enzyme treatment by filtration or centrifugation. The resultant liquefied or saccharified preparation may then be recombined, wholly or partly, with the protein-enhanced fraction with added lipid or prior to lipid incorporation and/or drying and the resultant product processed as described hereinbefore. The two fractions may thus be subjected to an appropriate degree or duration of treatment without consideration of what might affect the other fraction. Depending on the quantity of starch in the protein-enhanced fraction, this fraction may be treated with amylolytic enzymes as herein described and otherwise subjected, without recombination, to any of the various treatments herein described. Alternatively, the liquefied and saccharified starch may be used for other purposes known in the art or the starch, and hull and starch material may be dried and used as an animal feed ingredient or for other purposes.

For certain products, it may be an advantage to concentrate the protein in the protein-enhanced fraction, for example to minimise water removal in a drying operation.

It is evident that such a protein preparation which is free of carbohydrate and hull material and with or without addition of such supplementary or complementary protein sources as mentioned hereinbefore, may be dried to provide a protein-rich powder, or it may, if desired, be subjected to treatment with proteolytic enzymes to modify the properties of the protein or to provide protein hydrolysates, and used in the wet form or dried.

If the legume material contains soluble, non-heatlabile toxins, these may be diminished in quantity or removed as follows. Solids are separated from the slurry and are washed if necessary, the washings being combined with the separated liquid fraction. Protein contained in the liquid fractions and washings is recovered by precipitation methods known in the art and, if desired, redissolved and reprecipitated before recombination, the resultant toxin-containing liquors being discarded.

As described hereinbefore, ground legume material may be classified by air classification techniques to provide a fraction or fractions which, compared to the original legume material, are relatively higher in protein and lower in starch contents, and a fraction or fractions relatively lower in protein and higher in starch contents. Lower protein/higher starch legume material may be treated at least partly to pregelatinise the starch and/or, as hereinbefore described, to hydrolyse the starch and, if desired, with other enzymes, also as described hereinbefore. Such material may be used in its own right or further processed as described hereinbefore. Alternatively higher protein/lower starch material may, in the dry or in a slurried form, be recombined with the slurried and amylolytic enzyme-treated lower protein/higher starch fraction to form a slurry which is used or further processed as hereinbefore described. As a further alternative the higher protein/lower starch material may be slurried with aqueous liquid generally as described hereinbefore, homogenised if desired, and treated as desired with proteolytic and other enzymes generally as described hereinbefore. Lipid may be incorporated according to the conditions hereinbefore described, such an emulsion being recombined with the slurried and amylolytic enzyme-treated lower protein/higher starch fraction to form a combined slurry which is used or further processed as slurry hereinbefore described. The advantages to be gained from these procedures are that such things as slurry volumes and severity and duration of conditions can be adjusted to achieve the most suitable and economic processing conditions or to protect the predominant constituents of the respective fractions.

$\alpha$-Amylase may also be incorporated into unclassified legume material which is preferably in the ground form, and into classified legume material prior to slurrying. Similarly, one or both of $\alpha$-amylase and amyloglucosidase may be incorporated in at least partly pregelatinised forms of these starting materials.

It will also be clear to those versed in the art, that in suitable circumstances such higher protein/lower starch and lower protein/higher starch legume material fractions in powdered or other forms, may, with or without treatment at least partly to pregelatinise the starch contained therein as hereinbefore described, and with at least one of $\alpha$-amylase and amyloglucosidase, and as desired suitable minerals, vitamins and amino acids incorporated, be mixed with aqueous liquid at a suitable temperature and pH or combined with other ingredients as described herein to provide types of milk-replacer and other foods.

The advent of bound enzymes offers the possibility of effecting economies in enzyme utilisation in all the enzyme treatments previously described, and such enzymes as available may be employed at appropriate stages of the process.

Accordingly, the following various wet or dry emulsion products may be prepared by the process of the invention and contain apart from protein and lipid any one of the following:

Hull material and starch subjected to liquefaction;
Starch subjected to liquefaction;
Low molecular weight carbohydrates with hull material and some undigested starch;
Low molecular weight carbohydrates with some undigested starch material;
Low molecular weight carbohydrates with a small amount of undigested starch; and
A small amount of carbohydrate material.

Lipid droplets surrounded by a protein film are common to dry powdered forms of these products where lipid has been added. There has been considerable interest in scientific circles in protecting unsaturated fats fed to older ruminants from hydrogenation in the rumen so that such fats may be absorbed in an unsaturated state lower down the alimentary tract, and be deposited in the milk and meat products of the ruminant. It has been shown that if an emulsion of casein and polyunsaturated lipid or emulsified sunflower oil seed is treated with an aldehyde before spray drying, or if a spray-dried casein-polyunsaturated lipid emulsion is treated with an aldehyde, the protein film becomes less susceptible to digestion in the rumen and the polyunsaturated lipid protected by such protein is less susceptible to hydrogenation in the rumen. The products of animals fed on such preparations have been demonstrated to have favourably increased ratios of unsaturated to saturated fatty acids.

A feed supplement of this type is described and claimed in British Pat. No. 1,337,749 (CSIRO), claim 1 of which is in the following terms:

"A feed supplement for ruminant animals comprising a solid or liquid lipid material finely subdivided into discrete particles or globules, said lipid material having desired nutritional, therapeutic or prophylactic properties, and comprising a layer of the reaction product of an animal or plant protein and an aldehyde surrounding and thereby defining said discrete particles or globules of lipid material, said protein/aldehyde reaction product being resistant to breakdown in the rumen but susceptible to breakdown in the abomasum, and being substantially insoluble at pH levels greater than 5 and substantially soluble at pH levels less than 4."

Casein, however is normally so expensive as to make the application theoretical. The present invention therefore provides a new and economical approach to the solution of such a problem; firstly by utilising protein derived from legume material; secondly by utilising the protein without prior isolation, purification and drying procedures; and thirdly by adding polyunsaturated lipid sources such as those mentioned hereinbefore in substantial amounts to the wet preparations made from the legume material, since it provides only inherently small amounts of such lipid in itself. Similar products may also be obtained by combining legume material with sources of oil-rich plant material such as safflower seed, sunflower seed, peanuts, soybeans, and rapeseed, prior to emulsification and homogenisation, thus providing less expensive sources of lipid and augmenting the protein content of such preparations. Also other protein sources may be incorporated to complement and supplement the legume protein such as mentioned hereinbefore.

In such preparations where the lipid is to be protected by an aldehyde/protein reaction product made from legume material alone or legume material with supplementary oil-rich plant material or protein-containing material, the protein to lipid ratio will preferably be from 2:1 to 1:5 by weight. Because of the tendency of polyunsaturated lipids to be oxidatively unstable, a suitable antioxidant known in the art may be incorporated in the lipid prior to addition to the protein-containing solution or slurry.

To form the protective aldehyde/protein reaction product an aldehyde, such as formaldehyde or glutaraldehyde, preferably as a solution in water, may be incorporated into the emulsion prior to spray or drum drying, or during spray drying or after spray or drum drying the powdered product may be treated with the aldehyde solution to provide in either case aldehyde as a percentage of protein preferably in the range of from 1.0 to 4.0%.

Sulphur-containing amino acids or their analogues as hereinbefore mentioned may be incorporated in the lipid prior to its addition to the protein-containing solution or slurry or added independently to the protein-containing solution or slurry or to the emulsion prior to drying, i.e., at a suitable stage before aldehyde addition, to provide protection against degradation of such amino acids in the rumen and to allow absorption further down the alimentary tract.

A novel feature is that because of their nature the analogues of methionine hereinbefore mentioned can, in the absence of added lipid or lipid addition to the slurry, when incorporated in the slurry form droplets or particles surrounded by protein in their own right to form similarly protected aldehyde/protein reaction products as hereinbefore described.

In milk-replacer formulations for young ruminants, such as calves, dried whole milk, dried skim milk, fat-filled dry skim milk, dried delactosed whey powder and dried whey powder are normally included as the main protein- and energy-providing ingredients together, depending on the application, with smaller proportions of other ingredients which are less well tolerated by these young ruminants such as cereal flours and cereal starches, full fat soybean flour, defatted soybean flour, soybean protein concentrate and soybean protein isolate, products of fish or flesh origin, products of plant or vegetable origin and products of microbial origin. Also lipid, lactose, dextrose, mineral, vitamin and amino acid supplements, growth permitters and promoters, medicaments and flow agents are included. Consequently, while a product of the process of the present invention may in certain circumstances be fed to young mammals as a sole food source, it will usually be most satisfactory to combine it with other suitable ingredients commonly used in animal and human feeding. Small percentages of such products may usefully be incorporated in such mixtures for animal or human feeding, but it is usually more beneficial from the economic point of view to employ a reasonably high proportion of incorporation to effect substantial substitution of high cost ingredients such as dried skim milk. Between the extremes of sole ingredient and say the 1 to 5% proportions of incorporation, a suitable rate of incorporation of the products of the present invention will depend on such factors as the type of young ruminant, for example, to be fed and the level of performance desired in relation to feeding cost. For example, therefore, a dried powdered emulsion product according to this invention could be used to provide up to 80% of a calf food designed to contain 24% or more protein.

In this connection, those versed in the principles of nutrition and skilled in food formulation, will readily appreciate that suitable food products may also be prepared for young ruminants other than young calves, and piglets, foals, puppies, kittens and human infants.

Also suitable food products may be prepared for more mature animals such as pigs and horses.

As may be illustrated by conducting the process of the present invention with legume material derived from *Vicia faba L.* var. minor, the characteristic odour and flavour of certain legumes which is apparent in the flour when the flour made from them is slurried with water at the commencement of the process, are not apparent or are substantially reduced in the final wet or dried products. It is not known precisely how this surprising and desirable effect is achieved, but it is evidently dependent on processing in an aqueous medium with the temperature and pH modifications and additions of the amylolytic enzymes specified in the process. Also, depending on the degree of saccharification employed, attractive sweet flavours are obtained. This finding is contrary to that described in the art for treatment of legume material with amylolytic enzymes.

The wet or dried products therefore possess sweet, bland or inoffensive flavours, are smooth or fine in texture in the wet, reconstituted or dried states and are in the case of *Vicia faba L.* and many other legume materials off-white or light buff in colour. Thus they are particularly suitable for use in human food preparations.

For example, the products are well suited for use as or in milk-substitute preparations for human infants in combination with commonly used ingredients such as dried whole milk, dried skim milk, delactosed whey powder, soybean products such as flours, concentrates and isolates, other vegetable or plant protein sources, meat and fish products, cereal products such as starches and flours, sucrose, dextrose, lactose, and various fats and oils. Whether used alone or in combination with other ingredients supplementation may be made as necessary with minerals, vitamins and amino acids. They are especially beneficial where infants will not tolerate animal milks, foods made from them or other food sources. It will be apparent that such products will be particularly beneficial in countries where, for example, because of climatic or economic reasons cow or other milk is not readily available, but where legumes are grown and are traditionally part of the human diet. In such situations products containing added lipid and/or methionine or methionine analogues will be especially beneficial.

Solid foods for human infants are now commonly introduced before two months of age in the forms of such foods as meats, vegetables, cereals, dairy produce and fruits. Such foods may be prepared in the home, but a wide range of prepared foods in strained or homogenised forms, packed in cans or glass jars, or in dried forms, is available in many countries, and these prepared foods offer well formulated and suitably made foods in convenient forms for infants. A very wide range of ingredients is employed in the manufacture of such foods, including those hereinbefore mentioned, and also other ingredients such as sweetening agents, fats and oils, spices, flavouring agents and minerals, vitamins and amino acids. Dried whole milk and/or dried skim milk powders, and egg powders are commonly employed in such formulations as sources of protein and also as processing aids. It is a feature of this invention that the products herein described may be employed similarly. In particular, products containing added methionine or methionine analogues will provide a suitable means of providing methionine supplementation in formulations the nutritional value of which will be enhanced thereby, or which will enhance the nutritional value of the diet generally by virtue of such methionine supplementation.

The term infant food, as used in this Specification, therefore means a food for human infants from birth until at least two years of age, in the form of a milk-replacer or as a solid food as described hereinbefore.

As far as more general use of products according to the present invention in human foods is concerned, many applications will be apparent to those versed in the art and technology of human food manufacture. Because of the nature of the process and products, the wet or dried products lend themselves especially to use in the manufacture of dairy-type products which are defined as milk and cream substitutes, coffee whiteners, ice cream, whipped toppings, sour cream, cheeses and protein-containing margarines. They can be employed in meat products such as comminuted meat products, sausages, pastes and spreads, and also in the manufacture of spun, extruded and other meat substitutes, analogues or extenders made from vegetable protein sources. The term "meat products" will be used to include all such products, substitutes, analogues and extenders. They also find uses in the manufacture of bakery and confectionery products which are defined as breads, cakes and biscuits and high-protein versions of these products, and in creams and spreads. The products may also be used to advantage in human food products which are not so readily classified, such as canned goods of various descriptions for thickening and other purposes, in gravy powders and dehydrated soups, in beverage formulations of various descriptions and in salad dressings and mayonnaise.

It will be readily appreciated that certain products according to the invention will be particularly suitable for dietary or special food use for humans. For example, employment of vegetable fats and oils with suitable contents of unsaturated fatty acids will render otherwise suitable products suitable for use as foods forming part of special dietary regimens for those suffering, for instance, from cardiovascular conditions or multiple sclerosis in which saturated animal fats may be considered undesirable and unsaturated fats or oils of plant origin desirable. Thus while milk-substitutes, and other food preparations made from products described in this Specification based on suitable vegetable fats and oils can assist in minimising intake of saturated animal fats by substituting them for other food sources, they also act as vehicles for such vegetable fats and oils to ensure that adequate intakes required by special diets are obtained in a convenient and pleasant way. Equally when the need is for nutritive products, the constituents of which are readily digestible and which contain little or no indigestible constituents, products within the scope of the invention have applications, because of the liquefaction and saccharification of the legume starch, the small particle size of any lipid which is added and the solubilised condition of the protein, which may according to the invention, be treated to the required extent by proteolytic enzymes if so desired. Such preparations are especially useful in the preoperative treatment of patients prior to surgery for conditions of the intestinal tract and in their post-operative treatment, and in other conditions and states where low- or no-residue foods have been found to be beneficial, and in malabsorption syndromes such as cystic fibrosis and coeliac disease.

Since the preparations embodied in the invention may be made entirely from natural materials from the plant kingdom, that is legume materials, bacterial or fungal enzymes and fats or oils of plant origin, such products are eminently suitable for inclusion in the diets of vegetarians or in similar dietary regimens, in their own right or in suitable food compositions as described hereinbefore.

For the purpose of this Specification, such vegetarian and medical uses are regarded as dietetic.

In the related area of food technology, namely the pet food area, products according to the invention are suitable for incorporation as protein and energy sources in canned, semi-moist or dry biscuit-type or extruded products, particularly for dogs and cats, on account of their physico-chemical properties, and their bland or sweet flavours.

According to a yet further aspect of the invention whole or hulled legume material (as herein defined) having been suitably treated to pregelatinise the starch component may, with one or both of α-amylase and amyloglucosidase incorporated, be used as a food or ingredient for a food, preferably after slurrying with warm water. As desired such materials may be mixed with suitable minerals, vitamins and amino acids, or other suitable ingredients described herein to provide types of milk-replacer and other foods.

Some examples of the present invention are given hereinafter. These examples are given by way of illustration only, and are not intended to be construed as limiting the scope of the present invention.

EXAMPLE 1

Clean whole mature beans of *Vicia faba L.* var. minor were hulled by a suitable dry method. The resulting cotyledon fraction was ground to a fine powder passing a 1 mm mesh. Powdered cotyledon material recovered from the hulling waste may be combined with the ground cotyledons at this stage if desired.

The powdered legume material was slurried with water, employing continuous agitation at this and subsequent stages, to provide a slurry containing 35% legume material on a dry matter basis, and having an initial temperature of 30° C. Food grade sodium hydroxide was incorporated as necessary to adjust the pH of the slurry to 7.0.

0.75 Gram of a suitable α-amylase preparation containing 1,000 to 1,500 SKB units of activity per g was incorporated in the slurry per kg of legume material, and the slurry was passed through a high pressure homogeniser operating at a pressure of 1,500 psi or more. The slurry temperature was raised to 70° C. at a rate of 1C.°/min., and then to 85° C. at a rate of ½C.°/min. The temperature of the slurry was maintained at 85° C. for 45 min. and then, or after a further period at a lower temperature depending on the degree of starch dextrinisation required, the pH was adjusted to 7.0, the temperature being 85° C. or lower. The slurry may then be passed again through a homogeniser if desired at 1,500 psi, and it was then spray dried in a spray drier equipped with a centrifugal atomiser, the temperature conditions for spray drying being inlet 180° C. and outlet 80° C. The flow agent, aluminium silicate, was added during spray drying at the 1% level of dried product. The moisture content of the resultant spray dried product was from 3 to 5%.

EXAMPLE 2

The procedure of Example 1 was followed, but after the short or longer time dextrinisation steps melted hydrogenated palm kernel oil (HPKO) at a temperature of 85° C. and containing 2% of a suitable lecithin preparation, was incorporated in the slurry using a high speed mixer and a high pressure homogeniser operating at a pressure up to 2,000 psi, followed by spray drying as described in Example 1, to provide a lipid level of 22% in the spray dried product.

EXAMPLE 3

Melted N-stearoyl-DL-methionine (S-met) as such or mixed with its own weight of HPKO was added to the slurry of Example 1 prior to spray drying. Alternatively, the procedure of Example 2 was followed, but with incorporation of S-met in the melted HPKO to its incorporation in the slurry or addition of melted S-met or S-met in its own weight of HPKO to the formed emulsion slurry, to provide methionine in an amount of 1.5 to 2.0% of the protein content of the slurry to balance the amino acid profile, or at the rate of up to 150% of the protein to make a protein-protected methionine supplement.

EXAMPLE 4

The procedure of Example 1 was followed, but following the dextrinisation treatment of up to 45 min. at 85° C., the temperature of the slurry was lowered to 50° C., the pH of the slurry was adjusted by addition of food grade hydrochloric acid, to 4.5, and 1 g of a suitable amyloglucosidase preparation containing from 100 to 175 AG units per g was incorporated in the slurry per kg legume material. The selected pH and temperature conditions were maintained for 6 hours or longer to allow saccharification to proceed to the desired extent. Following this saccharification step the pH of the slurry was raised by incorporation of food grade sodium hydroxide to 7.5 and the temperature was adjusted to 85° C. The slurry was then spray dried as in Example 1 and had the following composition: 33.6% protein, 46.5% dextrose and 1.90% fat on a dry matter basis. According to the procedure used the spray dried slurry may have the following range of compositions: 25-35% protein, 40-55% dextrose and 1.5-2.0% fat.

EXAMPLE 5

The procedure of Example 4 was followed, but with lipid incorporation as described in Example 2. The resultant lipid-augmented spray dried product useful as an ingredient of a milk-replacer for calves had the following composition: 22.0% lipid, 26.5% protein and 34% dextrose on a dry matter basis. According to the procedure used the lipid-augmented spray dried product may have the following range of compositions: 10-65% lipid, 10-34% protein and 15-50% dextrose.

EXAMPLE 6

The procedure of Examples 4 and 5 was followed, but with incorporation of S-met as described in Example 3.

EXAMPLE 7

Filtration or centrifugation of the slurry of legume material was carried out as in Example 1 to provide a fraction relatively lower in protein and a fraction relatively higher in protein than the original slurry. The fraction lower in protein was treated as in Example 1 or 4 to dextrinise or saccharify the starch contained therein to the desired extent, the fraction higher in protein being combined with the dextrinised or saccharified slurry prior to spray drying to provide a slurry similar to that prepared for spray drying as in Example 1 or 4, but without the greater portion of the protein being exposed to the starch hydrolysis process.

EXAMPLE 8

The procedure of Example 7 was followed, but with addition of lipid and/or S-met as in Examples 2 and 3.

EXAMPLE 9

The procedure of Example 7 was followed, but with addition of the lipid and/or S-met as in Examples 2 and 3 respectively to the fraction relatively higher in protein prior to its combination with the dextrinised or saccharified lower protein slurry, employing the conditions of Examples 1 and 2, to provide preparations for spray drying similar to those of Examples 1, 2, 3, or 5 and 6, respectively.

EXAMPLE 10

A legume material powder as in Example 1 was classified by air classification techniques to provide a fraction relatively lower in protein and a fraction relatively higher in protein than the original legume material. The fraction lower in protein was slurried and treated as in Examples 1 and 4 to dextrinise or saccharify the starch therein to the desired extent, the fraction higher in protein, in powder form or in the form of a suitable slurry, being combined with the dextrinised or saccharified slurry to provide slurries for spray drying generally as described in Examples 7 to 9.

EXAMPLE 11

A milk-replacer formulation for replacement calves, and of analytical composition about 18% lipid and 24% protein was made up. The formulation contained 30% of a spray dried product as prepared in Example 5, the remainder of the formulation comprising the conventional fat-filled dried skim milk, dried skim milk, and dried whey powder and lipid, with an appropriate mineral, vitamin and methionine premix.

EXAMPLE 12

A spray dried milk-replacer formulation as in Example 11, reconstituted in warm water in a powder to water ratio of 1:9 by weight, was fed to Friesian male calves, from 4 days of age until 35 days of age, in comparison with a commercial-type milk-replacer of similar analytical composition, but comprising fat-filled skim milk powder, skim milk powder, dried whey powder, pure dextrose and an appropriate mineral and vitamin premix. All calves accepted the reconstituted milk-replacer formulations readily, drank them completely, thrived and gained weight satisfactorily during the feeding period, there being no apparent differences between the two feed treatments.

EXAMPLE 13

Each of the preparations formed according to Examples 2, 3, 5, 6, 8, 9 and 10, was treated with formaldehyde before, during or after drying to form an aldehyde/protein reaction product, the weight of formaldehyde employed being 1 to 4% by weight of the protein.

EXAMPLE 14

A pregelatinised legume material flour and an air-classified higher or lower protein fraction thereof, also pregelatinised, were each mixed separately with an α-amylase, an amyloglucosidase and a mixture thereof to prepare a food. Mineral, vitamin and amino acid supplements were mixed with portions of each of the foods so prepared. Such foods are preferably mixed with warm or hot water before consumption.

While the invention has been described in detail and with reference to specific embodiments thereof, it will be apparent to one skilled in the art that various changes and modifications can be made therein without departing from the spirit and scope thereof.

What is claimed is:

1. A process for preparing food product containing readily-assimilable nutrients in the form of protein and low molecular weight carbohydrates comprising, treating an aqueous liquid slurry, having a pH of 8 or less, of comminuted vegetable tissue selected from the group consisting of ground legume material and flaked legume material, the weight ratio of said legume material to said aqueous liquid being from 1:1 to 1:15 on a dry matter basis, said legume material being derived from edible seeds of leguminous plants belonging to the family Leguminosae and having a protein content of from 15 to 48% and a starch content of from 35 to 75% and having a lipid content of 0.5 to 5.0% on a dry matter basis or being derived from legumes of the genus Lupinus having a protein content of from 40 to 50%, with from 0.25 to 5.0 grams, per kilogram of dry legume material, of an amylolytic enzyme preparation having from 1000 to 1500 SKB units of α-amylase activity per gram at a temperature of 40° to 100° C. and for a period of from 2 to 120 minutes to liquefy and hydrolyse starch contained in said legume material to dextrins, adjusting the pH of the slurry to a value of from the natural value to 10, stirring for a period sufficient to solubilise protein contained in said legume material and adding lipid material in the presence of an emulsifying agent and in a manner such as to form a stable dispersion of lipid globules coated with solubilised protein, said natural value being the pH of the mixture obtained when whole or hulled legume materials is slurried with aqueous liquid of about neutral pH, adding to the amylolytic enzyme-treated legume material an aldehyde under conditions such as to form a reaction product of the aldehyde and protein derived from said legume material around the particles or globules of lipid material, said aldehyde/protein reaction product being substantially insoluble at a pH greater than 5 and substantially soluble at a pH less than 4.

2. The process according to claim 1, wherein said legume material is derived from seeds of leguminous plants of the genera selected from the group consisting of Phaseolus, Pisum, Lens, Cicer, Cajanus, Canavalia, Vigna, Dolichos, Lupinus and Vicia.

3. The process according to claim 2, wherein said seeds are from plants of the species selected from the group consisting of *Phaseolus lunatus* L., *Phaseolus coccineus* L. (syn. *Phaseolus multiflorus* L.), *Phaseolus mungo* L., *Phaseolus vulgaris* L. and *Phaseolus aureus* L.; *Pisum sativum* L. and *Pisum arvense* L.; *Lens culinaris* L. and *Lens esculenta* L.; *Cicer arietinum* L.; *Cajanus cajan* L. and *Cajanus indicus* L.; *Canavalia ensiformis* L.; *Vigna unguiculata* L. and *Vigna sinensis* L.; *Dolichos lablab* L.; *Lupinus luteus* L., *Lupinus luteus* L., *Lupinus angustifolius* L., *Lupinus albus* L.; *Vicia faba* L. and *Vicia sativa* L.

4. The process according to claim 1, wherein said seeds are from plants of the sub-species *Vicia faba* L. var. minor.

5. The process according to claim 1, wherein the amylolytic enzyme is an α-amylase which is added to the slurry at an initial slurry temperature of below 65° C., the temperature of the slurry is raised to a temperature in the range of from 65° to 70° C. at a rate of from 1½° to 2½° C./min., then to a temperature in the range of from 70° to 85° C. at a rate of from ¼° to 1½° C./min., and the attained slurry temperature is then maintained for a period of at least 15 minutes.

6. The process of claim 1, wherein the amylolytic enzyme treatment further comprises increasing the degree of dextrinisation and saccharification by maintaining the slurry at a temperature of from 40° to 70° C. for a period of up to 96 hours.

7. The process according to claim 6 wherein the degree of dextrinization and saccharification is increased by maintaining the slurry at a temperature of from 55° to 65° C. for a period of up to 96 hours.

8. The process according to claim 1, wherein the pH of the slurry is adjusted to a value of from 3.0 to 7.0 and the temperature of the slurry is adjusted to a temperature of from 40° to 70° C., which further comprises adding amylglucosidase and maintaining these conditions to increase the degree of saccharification of starch and dextrins present in the slurry, and thereafter adjusting the slurry to a pH of below 9.0 and to a temperature of below 85° C.

9. The process according to claim 1 which further comprises separating by centrifugation or filtration at least a portion of the protein component from the slurry before the amylolytic enzyme treatment as a protein-enhanced fraction in order to allow separate treatment of one or both of said protein-enhanced fraction and of a complementary starch-enhanced fraction thereby separated.

10. The process according to claim 1, wherein said legume material has been separated by fine grinding and air classification to provide a protein-enhanced fraction and a starch-enhanced fraction, said starch-enhanced fraction being subjected to said amylolytic enzyme treatment, and subsequently recombining said protein-enhanced fraction with the starch-enhanced fraction after the starch-enhanced fraction has been subjected to said amylolytic enzyme treatment.

11. The process according to claim 1 which further comprises adding to the slurry an enzyme preparation selected from the group consisting of preparations having cellulase activity, preparations having haemicellulase activity, preparations having pectinase activity, preparations having α-galactosidase activity and preparations having invertase activity.

12. The process according to claim 1, wherein said legume material contains vicine, said process further comprises adding a β-glucosidase to the slurry, the slurry being at a temperature of from 20° to 65° C. and a pH of from 4.5 to 7.0, maintaining these conditions to allow conversion of vicine to divicine and glucose, and adjusting the pH of the slurry to alkalinity to cause degradation of the divicine.

13. The process of claim 1 wherein the steps of adjusting the pH, stirring and adding lipid materials, are performed on the aqueous liquid slurry before the step of treating the aqueous liquid slurry with the amylolytic enzyme preparation.

14. The process of claim 13 which further comprises adding a nutrient methionine compound to the amylolytic enzyme treated legume material.

15. The process according to claim 14, wherein the methionine compound is selected from the group consisting of methionine, N-stearoyl-DL-methionine, N-oleoyl-DL-methionine, N-decanoyl-DL-methionine, N-octanoyl-DL-methionine, thereof, an ester thereof, and a fatty acid glycerol ester of methionine.

16. The process according to claim 15 wherein the methionine compound is a methionine analogue selected from the group consisting of N-stearoyl-DL-methionine, N-oleoyl-DL-methionine, N-decanoyl-DL-methionine and N-octanoyl-DL-methionine and wherein the methionine analogue is in the form of a particle or droplet enrobed in a film of legume material protein.

17. The process according to claim 1, wherein the slurry is homogenised to effect particle size reduction, disintegration and dispersion and thereby maximize enzyme action.

18. The process according to claim 1 which further comprises drying the slurry.

19. The process according to claim 18, wherein the slurry is spray dried.

20. The process according to claim 1 wherein the pH of the aqueous liquid slurry is in the range of from 6.0 to 7.0 and said temperature is in the range of from 40° to 85° C.

21. The process of claim 1 wherein the steps of adjusting the pH, stirring and adding lipid materials, are preformed on the aqueous liquid slurry after the step of treating the aqueous liquid slurry with the amylolytic enzyme preparation.

22. The process of claim 21 which further comprises adding a nutrient methionine compound to the amylolytic enzyme treated legume material.

23. The process according to claim 22 wherein the methionine compound is selected from the group consisting of methionine, N-stearoyl-DL-methionine, N-oleoyl-DL-methionine, N-decanoyl-DL-methionine, N-octanoyl-DL-methionine, a salt thereof, an ester thereof, and a fatty acid glycerol ester of methionine.

24. The process according to claim 23 wherein the methionine compound is a methionine analogue and is selected from the group consisting of N-stearoyl-DL-methionine, N-oleoyl-DL-methionine, N-decanoyl-DL-methionine, and N-octanoyl-DL-methionine, wherein the nutrient methionine compound and lipid are in the form of particles or globules enrobed in a film of legume material protein.

25. A process according to claim 1, wherein the lipid material is selected from animal fats, vegetable fats, vegetable oils, hydrogenated animal fats, hydrogenated vegetable fats and hydrogenated vegetable oils.

26. A process for preparing food product containing readily-assimilable nutrients in the form of protein and low molecular weight carbohydrates comprising,
treating an aqueous liquid slurry, having a pH of 8 or less, of comminuted vegetable tissue selected from the group consisting of ground legume material and flaked legume material, the weight ratio of said legume material to said aqueous liquid being from 1:1 to 1:15 on a dry matter basis, said legume material being derived from edible seeds of leguminous plants belonging to the family Leguminosae and having a protein content of from 15 to 48% and a starch content of from 35 to 75% and having a lipid content of 0.5 to 5.0% on a dry matter basis or being derived from legumes of the genus Lupinus having a protein content of from 40 to 50%, with from 0.25 to 5.0 grams, per kilogram of dry legume material, of an amylolytic enzyme preparation having from 1000 to 1500 SKB units of α-amylase activity per gram at a temperature of 40° to 100° C. and for a period of from 2 to 120 minutes to liquefy and hydrolyse starch contained in said legume material to dextrins, incorporating a nutrient methionine compound into the amylolytic enzyme-treated legume material and adding an aldehyde to the amylolytic enzyme-treated legume material under conditions such as to form a reaction product of the aldehyde and protein derived from said legume material around the particles or globules of methionine derivative, said aldehyde/protein reaction product being substantially insoluble at a pH greater than 5 and substantially soluble at a pH less than 4.

27. A process for preparing a food product comprising raising the temperature of an α-amylase-containing aqueous liquid slurry of legume material selected from the group consisting of ground legume material and flaked legume material, said legume material being derived from edible seeds of leguminous plants belonging to the family Leguminosae and having a protein content of from 15 to 48% and a starch content of from 35 to 75% and having a lipid content of from 0.5 to 5.0% on a dry matter basis or being derived from legumes of the genus Lupinus having a protein content of from 40 to 50%, the slurry having a pH of from 5.0 to 8.0, said slurry from 0.25 to 5.0 grams per kilogram of dry legume materials, of α-amylase preparation having from 1000 to 1500 SKB units α-amylase activity per gram, the weight ratio of said legume material to said aqueous liquid being from 1:1 to 1:15, on a dry matter basis, to a temperature of from 40° to 100° C. and maintaining the temperature so attained for a period of from 2 to 120 minutes, incorporating a nutrient methionine compound into the α-amylase-treated legume material and adding to the α-amylase-treated legume material an aldehyde under conditions such as to form a reaction product of the aldehyde and protein derived from said legume material around the particles or globules of nutrient methionine compound, said aldehyde/protein reaction product being substantially insoluble at a pH greater than 5 and substantially soluble at a pH less than 4.

28. A process for preparing food product comprising raising the temperature of an α-amylase containing aqueous liquid slurry of hulled and ground or flaked legume material, said legume material being derived from edible seeds of leguminous plants belonging to the family Leguminosae and having a protein content of from 15 to 48% and a starch content of from 35 to 75% and having a lipid content of from 0.5 to 5.0% on a dry matter basis or being derived from legumes of the genus Lupinus having a protein content of from 40 to 50% with aqueous liquid having a pH of from 5.0 to 8.0, said slurry containing from 0.25 to 5.0 grams per kilogram of dry legume material, of α-amylase preparation having from 1000 to 1500 SKB units α-amylase activity per gram, the weight ratio of said legume material to said aqueous liquid being from 1:1 to 1:15, on a dry matter basis, to a temperature of from 40° to 100° C., maintaining the temperature for a period of from 2 to 120 minutes, lowering the slurry temperature to 40° to 75° C. and adjusting the slurry pH to from 3.0 to 7.0 and treating the slurry with from 0.25 to 6.25 grams per kilogram of dry legume material of an amyloglucosidase activity per gram for a period of up to 10 hours to hdrolyse the starch and dextrins to dextrose and di- and tri-saccharides and elevating the temperature of the resultant slurry to a temperature of from 40° to 80° C. and its pH to a value of from 5.0 to 9 after starch and dextrin hydrolysis, incorporating a nutrient methionine compound into the amyloglucosidase-treated material and adding to the amyloglucosidase-treated legume material, an aldehyde under conditions such as to form a reaction product of the aldehyde and protein derived from said legume material around the particles or globules of nutrient methionine compound, said aldehyde/protein reaction product being substantially insoluble at a pH greater than 5 and substantially soluble at a pH less than 4.

29. The process according to claim 28 which further comprises subsequently incorporating lipid into the slurry.

* * * * *